United States Patent [19]

Eguchi

[11] Patent Number: 5,597,626
[45] Date of Patent: Jan. 28, 1997

[54] LIQUID CRYSTAL DEVICE

[75] Inventor: Ken Eguchi, Yokohama, Japan

[73] Assignee: Canon Kabushiki Kaisha, Tokyo, Japan

[21] Appl. No.: 165,454

[22] Filed: Dec. 13, 1993

[30] Foreign Application Priority Data

Dec. 11, 1992 [JP] Japan ................................. 4-352364

[51] Int. Cl.$^6$ ............................................. G02F 1/1337
[52] U.S. Cl. ................................ 428/1; 349/123; 349/132
[58] Field of Search ........................... 428/1; 359/75–79

[56] References Cited

U.S. PATENT DOCUMENTS

| | | | |
|---|---|---|---|
| 4,367,924 | 1/1983 | Clark et al. | 350/334 |
| 4,561,726 | 12/1985 | Goodby et al. | 350/341 |
| 4,655,561 | 4/1987 | Kanbe et al. | 350/350 |
| 5,009,489 | 4/1991 | Eguchi et al. | 350/341 |
| 5,046,822 | 9/1991 | Matsuda et al. | 359/75 |
| 5,118,538 | 6/1992 | Escher et al. | 428/1 |
| 5,239,398 | 8/1993 | Yanagisawa et al. | 359/76 |

FOREIGN PATENT DOCUMENTS

| | | |
|---|---|---|
| 56-107216 | 8/1981 | Japan . |
| 59-193427 | 11/1984 | Japan . |

*Primary Examiner*—Alexander S. Thomas
*Attorney, Agent, or Firm*—Fitzpatrick, Cella, Harper & Scinto

[57] ABSTRACT

A liquid crystal device is constituted by disposing a liquid crystal between a pair of substrates each having an electrode thereon and coated with a polymeric ion-conductive film and an organic electroconductive alignment film in this order or in reverse order. The alignment film may be provided with an electroconductivity selectively at parts thereof above the electrode so as to suppress occurrence of crosstalk between pixels. The above arrangements of the ion-conductive film and the alignment film are suitable for providing a practical liquid crystal device affording a high contrast and a moderate V-T characteristic advantageous for halftone display.

10 Claims, 8 Drawing Sheets

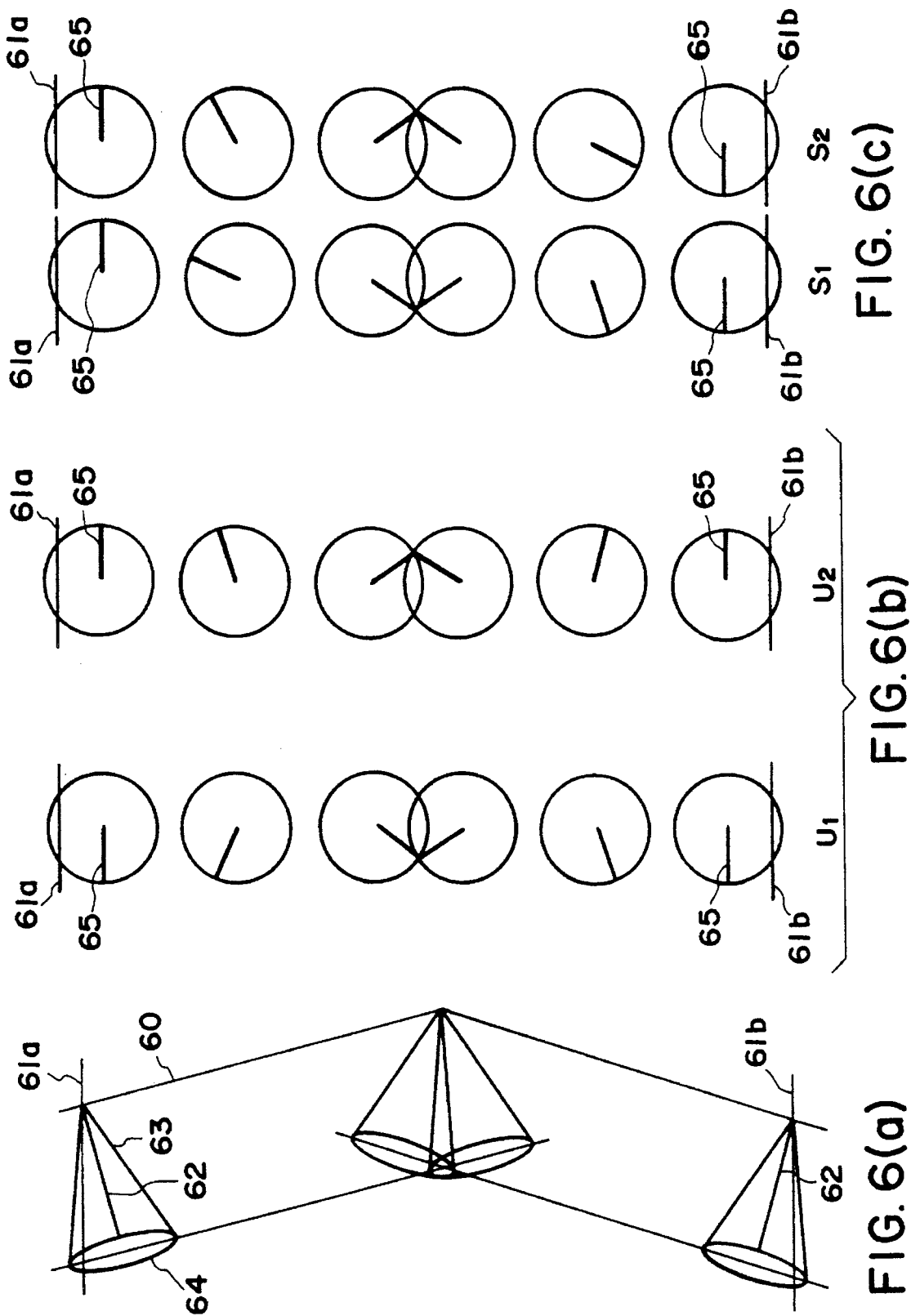

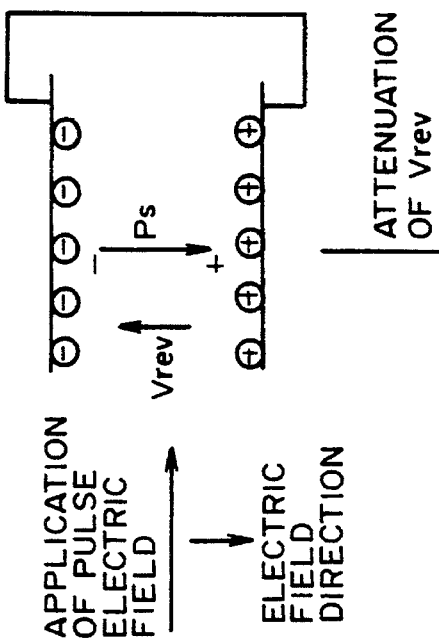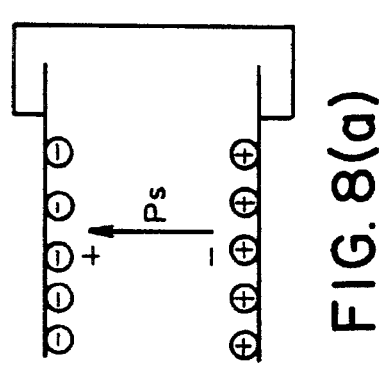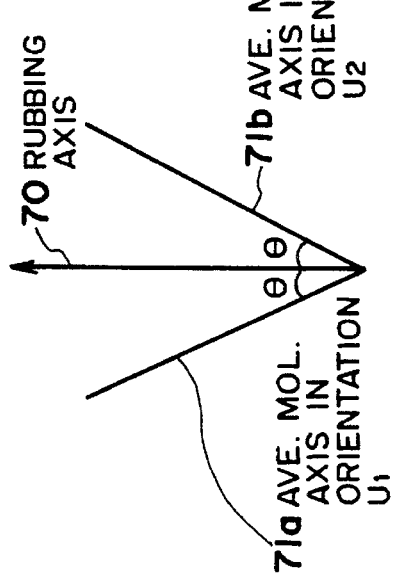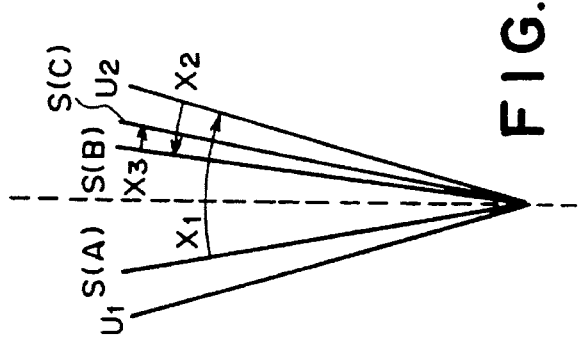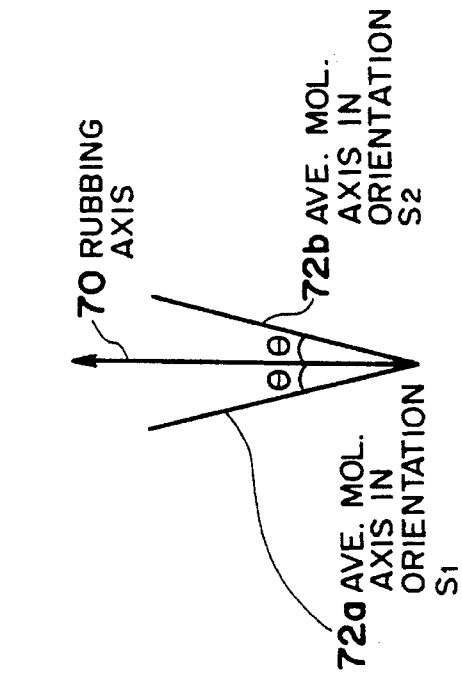

LIQUID CRYSTAL DEVICE

FIELD OF THE INVENTION AND RELATED ART

This invention relates to a liquid crystal device to be used in a liquid crystal display device or a liquid crystal-optical shutter, etc., particularly a liquid crystal device using an electroconductive alignment layer with improved alignment characteristics.

TV images are highly defined, half-tone motion pictures. Display of such TV images requires the highest level of display technologies satisfying high resolution, high-speed responsiveness, multi-level gradation display, high contrast, high-reliability and color image formation. In these respects, TV images displayed on a CRT are excellent in quality. However, along with a trend of desiring larger display areas, light weight liquid crystal display apparatus have attracted attention, and extensive research has been made recently on TV image display methods using an active matrix-type liquid crystal display device wherein nematic liquid crystal is directly driven by a switching element disposed at each pixel. As the switching element, a TFT (thin film transistor) has been considered most suitable, but it provides a great difficulty in application to a larger area device because it requires a of complicated production process with a large number of steps involved therein.

On the other hand, a display device of the type which controls transmission of light in combination with a polarizing device utilizing the refractive index anisotropy of ferroelectric liquid crystal molecules has been proposed by Clark and Lagerwall (Japanese Laid-Open Patent Application No. 107216/1981, U.S. Pat. No. 4,367,924). The ferroelectric liquid Crystal has generally chiral smectic C phase (SmC*) or H phase (SmH*) of a non-helical structure and, in the SmC* or SmH*, phase, shows a property of assuming either one of a first optically stable state and a second optically stable state responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display according to a simple matrix drive scheme in view of its function.

A ferroelectric liquid crystal device is driven according to an essentially binary display scheme based on control between two bistable states of the liquid crystal and accordingly has been considered unsuitable for halftone display. However, with development of gradation display technique for ferroelectric liquid crystal, it is expected to apply the liquid crystal to a wider scope of application utilizing the excellent properties thereof. As a gradation display method according to a simple matrix drive scheme, there has been proposed an area gradation method wherein transition between two bistable alignment states is controlled microscopically within a pixel to form minute domains within the pixel (Japanese Laid-Open Patent Application (JP-A) 59-193427). However, according to the alignment control technique proposed heretofore, it has been difficult to stably and sufficiently control the above-mentioned minute domains, so that it has been difficult to realize practically feasible gradation display. It has been also difficult to provide a sufficiently increased contrast between the bistable two states and sufficiently remove the afterimage or hysteresis phenomenon in the course of switching.

For an optical modulating device using a ferroelectric liquid crystal having such bistability to exhibit desirable driving characteristics, it is required that the liquid crystal disposed between a pair of substrates should be in such a molecular alignment state that conversion between the above two stable states may occur effectively upon the application of an electrical field.

Further, in a liquid crystal device utilizing birefringence of a liquid crystal, the transmittance under right angle cross nicols is given by the following equation:

$$I/I_0 = \sin^2 4\theta \sin^2(\Delta nd/\lambda)\pi,$$

wherein $I_0$: incident light intensity, $I$: transmitted light intensity, $\theta$: tilt angle, $\Delta n$: refractive index anisotropy, $d$: thickness of the liquid crystal layer, $\lambda$: wavelength of the incident light.

The tilt angle $\theta$ in the above-mentioned non-helical structure is recognized as a half of an angle between the average molecular axis directions of liquid crystal molecules in a twisted alignment in a first orientation state and a second orientation state. According to the above equation, it is shown that a tilt angle $\theta$ of 22.5 degrees provides a maximum transmittance and the tilt angle $\theta$ in a non-helical structure for realizing bistability should desirably be as close as possible to 22.5 degrees in order to provide a high transmittance and a high contrast.

A method for aligning a ferroelectric liquid crystal should desirably be such that molecular layers each composed of a plurality of molecules of a smectic liquid crystal are aligned uniaxially along their normals, and accordingly a polyimide film subjected to rubbing has been widely used. As an alignment method for a ferroelectric liquid crystal, particularly a chiral smectic liquid crystal in a non-helical Structure, one disclosed in U.S. Pat. No. 4,561,726 has been known for example.

However, angle $\theta$ (an angle shown in FIG. 4 as described below) in a ferroelectric liquid crystal with a non-helical structure obtained by alignment with a rubbed polyimide film is generally smaller than tilt angle Ⓗ (the angle Ⓗ is a half of the apex angle of the cone shown in FIG. 3 as described below) in the ferroelectric liquid crystal having a helical structure. Particularly, the tilt angle $\theta$ in a ferroelectric liquid crystal with a non-helical structure obtained by alignment with a rubbed polyimide film was generally on the order of 3 –8 degrees, and the transmittance at that time was at most about 3 to 5%.

Thus, according to Clark and Lagerwall, the tilt angle in a ferroelectric liquid crystal with a non-helical structure realizing bistability should have the same angle as the tilt angle in the ferroelectric liquid crystal having a helical structure, but in fact the tilt angle $\theta$ in a non-helical structure is smaller than the tilt angle Ⓗ in a helical structure. It has been also clarified that such a smaller angle $\theta$ in a non-helical structure is attributable to a twist alignment of liquid crystal molecules. More specifically, in a ferroelectric liquid crystal of a non-helical structure, molecular axes 52 and 53 adjacent to upper and lower substrates provided with a uniaxial alignment axis 51 given rubbing or oblique vapor deposition are twisted continuously with respect to a normal to the substrates in a twist direction 54 as shown in FIG. 5. This causes the tilt angle $\theta$ in the non-helical structure to be less than the tilt angle Ⓗ in the helical structure.

Further, in an alignment state of a chiral smectic liquid crystal attained by a conventional polyimide alignment film subjected to a rubbing treatment, when a liquid crystal is supplied with a voltage of one polarity for switching from a first optically stable state (e.g., a white display state) to a second optically stable state (e.g., a black display state) and then the voltage of one polarity is removed, the ferroelectric liquid crystal layer is supplied with a reverse electric field Vrev (due to the presence of the polyimide film as an insulating layer between the electrode and the liquid crystal layer), which causes an after-image during display (as reported in "Switching characteristic of SSFLC" by Akio Yoshida, "Preprint for Liquid Crystal Forum, October 1987" p.p. 142–143). Further, there is also caused a problem of hysteresis in switching due to charge accumulation with ion species, etc.

SUMMARY OF THE INVENTION

A principal object of the present invention is to provide a liquid crystal device having solved the above-mentioned problems.

A specific object of the present invention is to provide a liquid crystal device providing an improved contrast ratio between two stable states and causing no after-image and hysteresis during switching.

Another object of the present invention is to provide a liquid crystal device capable of providing sufficient stability and controllability of minute domains generated in each pixel in order to realize a practicable gradation characteristic.

According to the present invention, there is provided a liquid crystal device, comprising: a pair of substrates each having thereon an electrode, a polymeric ion-conductive film and an organic electroconductive alignment film in this order, and a liquid crystal disposed between the substrates; wherein said polymeric ion-conductive film comprises a material selected from the group consisting of polyether, polyester, polyimine and crosslinked polymer thereof represented by the following formulae (1) to (6):

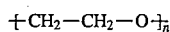 (1)

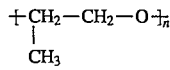 (2)

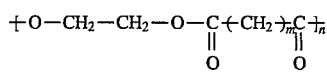 (3)

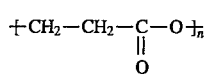 (4)

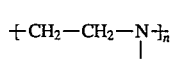 (5)

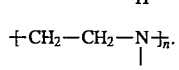 (6)

According to the present invention, there is also provided a liquid crystal device, comprising: a pair of substrates each having thereon an electrode, an organic electroconductive alignment film, and a polymeric ion-conductive film in this order, and a liquid crystal disposed between the substrates; wherein said polymeric ion-conductive film comprises a material selected from the group consisting of polyether, polyester, polyimine and crosslinked polymer thereof represented by the following formulae (1) to (6):

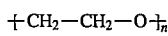 (1)

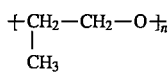 (2)

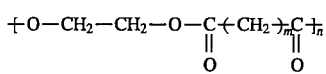 (3)

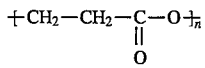 (4)

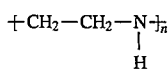 (5)

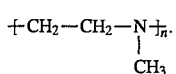 (6)

According to the present invention, there is further provided a liquid crystal device, comprising: a pair of substrates each having thereon an electrode and an alignment film in this order, and a liquid crystal disposed between the substrates; wherein said alignment film comprises an ion-conductive polymer selected from the group consisting of polyether, polyester, polyimine and crosslinked polymer thereof represented by the following formulae (1) to (6):

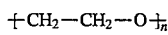 (1)

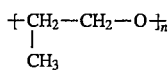 (2)

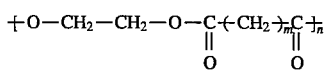 (3)

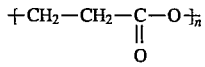 (4)

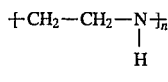 (5)

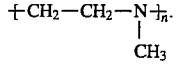 (6)

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 6(a) is a schematic sectional view showing an alignment state of a chiral smectic liquid crystal aligned according to the present invention; FIG. 6(b) is an illustration of C-director alignments in a uniform alignment state; and FIG. 6(c) is an illustration of C-director alignments in a splay alignment state.

FIGS. 7A and 7B are plan views illustrating tilt angles $\theta$ in a uniform alignment state and a splay alignment state, respectively.

FIGS. 8A–8C are sectional views showing a charge distribution, a direction of a spontaneous polarization $P_S$ and a direction of a reverse electric field Vrev.

FIG. 9 is a schematic plan view illustrating changes in tilt angle $\theta$ during and after application of an electric field.

DETAILED DESCRIPTION OF THE INVENTION

Figure 1:
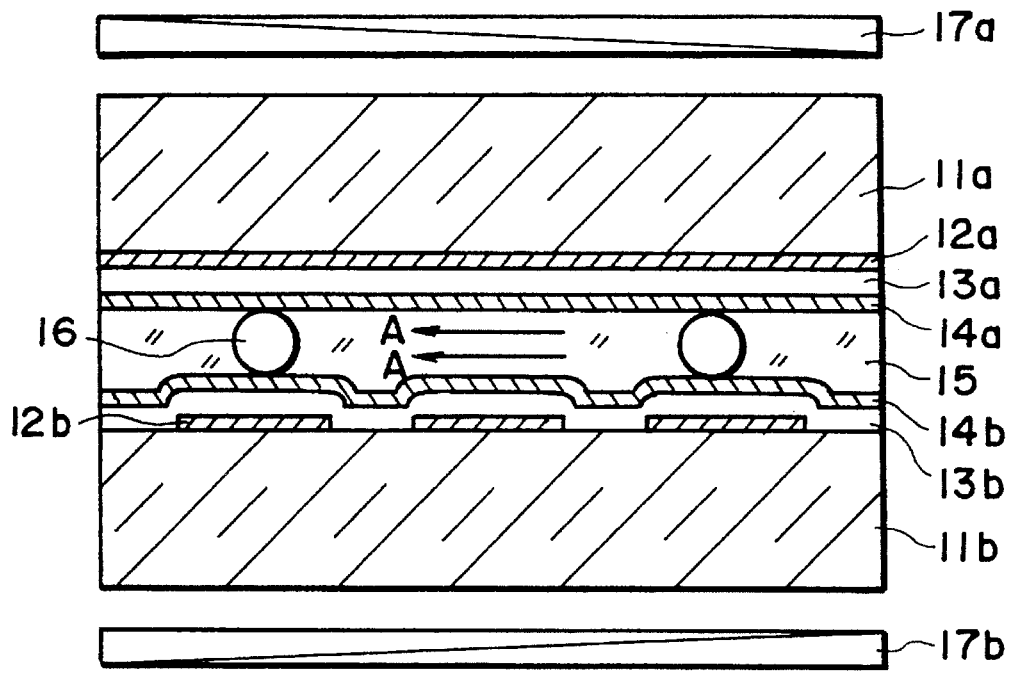
FIGS. 1 and 2 are respectively a schematic sectional view of an embodiment of the liquid crystal device according to the present invention.

FIG. 1 is a schematic sectional view of an embodiment of the liquid crystal device according to the present invention.

The liquid crystal device comprises a pair of substrates (glass plates) 11a and 11b which are coated with transparent electrodes 12a and 12b of $In_2O_3$, ITO (indium tin oxide), etc., polymeric ion-conductive films 13a and 13b, and further with alignment films 14a and 14b.

A liquid crystal (e.g., a ferroelectric or chiral smectic liquid crystal) 15 is disposed between the alignment films 14a and 14b and the spacing therebetween is set to provide the liquid crystal layer 15 with a thickness (e.g., 0.1–3 microns) which is sufficiently small to suppress the formation of a helical structure of the chiral smectic liquid crystal 15 by disposing spacer beads 16 of, e.g., silica, alumina, etc. between the alignment films 14a and 14b, whereby the chiral smectic liquid crystal 15 assumes a bistable alignment state. The thus formed cell structure is sandwiched between a pair of polarizers 17a and 17b arranged in, e.g., cross nicols.

Figure 2:
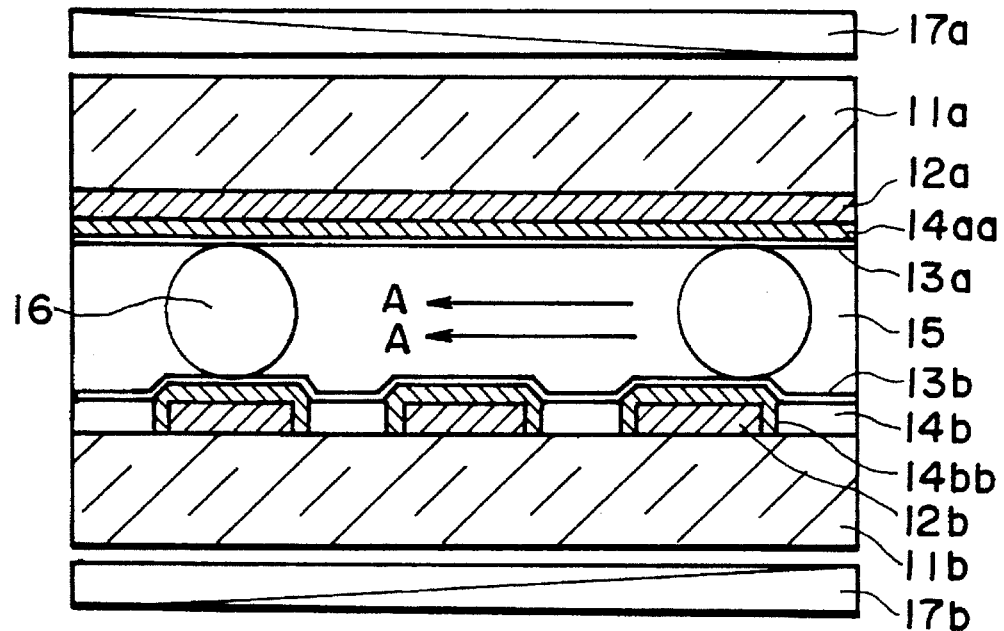

FIG. 2 is a schematic sectional view similar to FIG. 1 of another embodiment of the liquid crystal device according to the present invention. Reference numerals have the same meanings as those in FIG. 1. In this embodiment, parts (or high conductive parts) 14aa and 14bb of the alignment films 14a and 14b corresponding to pixels, i.e., parts on the electrodes of the alignment films, are selectively imparted with an enhanced electroconductivity. The polymeric ion-conductive films 13a and 13b are disposed between the liquid crystal layer 15 and the alignment films 14a and 14b including the parts 14aa and 14bb, respectively.

The alignment film used in the liquid crystal device according to the present invention as shown in FIG. 1 or 2 may preferably be an organic electroconductive alignment film. Examples of a material for the organic electroconductive alignment film may suitably include: polypropyrrole, polyaniline and derivatives thereof represented by the following formula (7) and (8):

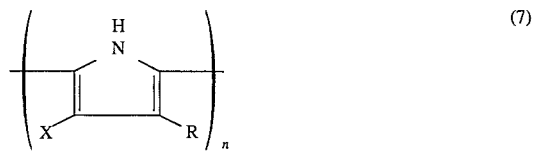

(7)

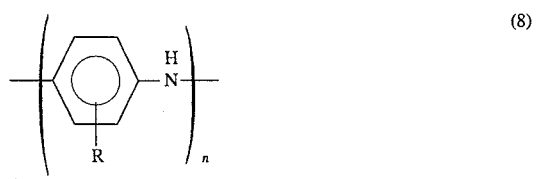

(8)

wherein X=H or —CO—R, R=$C_mH_{2m+1}$, and m is an integer of 0–12; polythiophene, polyarylenevinylene and derivatives thereof; and poly(pyridine-2,5-diyl), poly(2,2'-bipyridine-5,5'-diyl), poly(pyridine-5,2-diyl-thiophene-2,5-diyl) and derivatives thereof.

In the present invention, materials for the alignment film are not restricted to those for the organic electroconductive alignment film described above. Polymeric materials having a good alignment characteristic and an ability to control and impart an electroconductivity (or conductivity) of at least $10^{-10}$ S/cm, preferably $10^{-8}$ to $10^{-4}$ S/cm, to a resultant alignment film may also be used for the materials for the alignment film.

The electroconductivity (S/cm) of a (protective) film may be measured as a reciprocal of the sheet resistivity ($\Omega$.cm) of the film. More specifically, for the measurement, a film of a similar thickness ($\Delta$d) and the same material as the object film is formed on a glass substrate and a pair of a circular electrode (radius: r) and a ring electrode with an annular spacing (annular area: $S_0$) from the circular electrode are disposed on the film, whereby a resistance value $R_0$ is measured for the annular spacing. The sheet resistivity R ($\Omega$.cm) is calculated as $R=R_0 \times S_0 (2\pi r \times \Delta d)$ from which the electroconductivity is calculated as the reciprocal.

It is generally preferred to add a dopant in order to increase an electroconductivity of the above-mentioned materials for the alignment film and increase the carrier density. The dopant may preferably be an ionic low-molecular weight compound, suitable examples thereof may include: halogen ions, and oxide anions, such as perchlorate ions, sulfate ions and nitrate ions. It is also possible to use metal ions, such as alkaline metal ions.

In order to obviate the problem of crosstalk between pixels in a liquid crystal cell of a simple matrix structure, it is necessary to maintain a resistivity of at least $10^5$ ohm.cm between pixels of the alignment film. For this reason, in the embodiment shown in FIG. 2, the parts 14aa and 14bb on the electrodes of the alignment films 14a (not shown) and 14b are locally selectively imparted with an electroconductivity of at least $10^{-4}$ S/cm so as to prevent the occurrence of the crosstalk.

The locally enhanced electroconductivity may for example be effected by doping with ionic dopants as described above during electrolytic oxidation. The electrolytic oxidation is locally selectively caused at the parts 14aa and 14bb on the electrodes so that the parts can be locally selectively imparted with an enhanced electroconductivity. The electrolytic oxidation may be performed by applying a voltage to the film within an electrolyte organic solution containing a desired ion. However, the method of local doping is not restricted to the electrolytic oxidation as far as the object of the invention can be accomplished.

The alignment film preferably be transparent to light in the visible region and may be formed in a conventional manner by using the above-mentioned materials. In the case of forming an alignment film by coating or vapor deposition, the alignment film may be formed in a thickness of 30–500 Å, preferably 30–200 Å, more preferably 30–100 Å. The alignment film may preferably be formed in a small thickness in order to effectively suppress the occurrence of a reverse electric field due to charge accumulation, e.g., by the LB (Langmuir-Blodget) method. The alignment film may preferably be formed in a thickness of 4–200 Å, more preferably 16–100 Å, further preferably 16–50 Å, when prepared by the LB method. The direction of withdrawing a substrate for forming an alignment film thereon may be appropriately selected since there is no remarkable difference observed between a case where two substrates are affixed to each other so that their withdrawal directions are in identical directions (e.g., as identified by A in FIG. 1 or FIG. 2) and a case where their withdrawal directions are in mutually opposite directions.

In order to provide the alignment film with a better alignment effect, it is preferred to further rub the surface of the alignment film. The rubbing may be applied to only one of the substrates or both substrates each having an alignment film so that the rubbing directions are parallel, anti-parallel or cross each other with a small angle of, e.g., 1–15 degrees, depending on the alignment characteristic of a liquid crystal material used. The rubbing per se may be performed in a conventional manner. In order to further improve the alignment effect of the alignment film used in the present invention, a material for the alignment film can be used in combination with an alignment material such as polyamide or polyimide.

A ferroelectric liquid crystal has spontaneous polarization Ps, whereby an internal electric field is induced in an alignment state of the ferroelectric liquid crystal. As will be specifically described hereinafter, such an internal electric field causes a charge accumulation at the surface of an alignment control layer, thus resulting in occurrence of a reverse electric field Vrev. The charge accumulation may be attributable to an ion localization within the alignment control layer, interfacial adsorption of trace amounts of ion species within a liquid crystal layer or formation of an electrical double layer.

There has been pointed out a fact that a hysteresis phenomenon with respect to an initial transmittance-voltage characteristic during switching caused by occurrence of a reverse electric field with charge accumulation can be relaxed or alleviated by using an electroconductive alignment film. The electroconductive alignment film, however, has left still room for improvement in a hysteresis phenomenon, which may be attributable to fluctuation of a layer structure of a ferroelectric liquid crystal, at the time of short circuit after application of a switching voltage.

In view of such drawbacks, the liquid crystal device as shown in FIG. 1 according to the present invention is characterized by disposing a polymeric ion-conductive film (e.g., 13a or 13b in FIG. 1) between an electrode and an (organic electroconductive) alignment layer. Such a laminar structure of: electrode/polymeric ion-conductive film/organic electroconductive alignment film/ferroelectric liquid crystal layer (having an internal electric field due to Ps) can be regarded as a kind of electric cell structure. Accordingly, when an electric field for driving is applied, an electrical quantity is supplied to the above-mentioned laminar structure with inversion of a ferroelectric liquid crystal and stored or accumulated therein. Since the resultant laminar structure can substantially retain a potential of the alignment film to a certain level during relaxation of self-discharge even at short circuit, fluctuation of the ferroelectric liquid crystal layer structure may presumably be suppressed, thus preventing occurrence of the hysteresis phenomenon.

An electroconductive polymer component constituting an alignment film generally has a longer π conjugated bond and thus generally has a high rigidity and a small ion mobility. As a result, when such an alignment film is used, a relaxation effect on a reversal electric field by a quick movement of ion species adsorbed to the interface between the alignment film and a liquid crystal layer during a high-speed switching of a ferroelectric liquid crystal may be assumed to be small. In view of such circumstances, the liquid crystal device as shown in FIG. 2 according to the present invention is characterized by disposing a polymeric ion-conductive film (e.g., 13a or 13b in FIG. 2) at the interface between an (organic electroconductive) alignment film and a liquid crystal layer, thus enhancing an ion mobility at the interface to effectively suppress the aforementioned hysteresis phenomenon with respect to an initial transmittance-voltage characteristic during switching caused by occurrence of a reverse electric field with charge accumulation of ion species etc. The liquid crystal device as shown in FIG. 2 also has a laminar structure of: electrode/organic electroconductive alignment film/polymeric ion-conductive film/ferroelectric liquid crystal layer. Similarly as in the liquid crystal device of the present invention as shown in FIG. 1, such a laminar structure can also be regarded as a kind of electric cell, thus being expected to bring about the effect of preventing occurrence of the hysteresis phenomenon.

The polymeric ion-conductive film used in the liquid crystal device according to the present invention as shown in FIG. 1 or 2 may preferably comprise a material selected from the group consisting of polyether, polyester, polyimine and crosslinked polymer thereof represented by the following formulae (1) to (6):

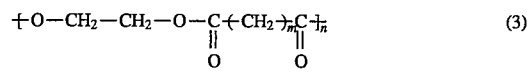

The crosslinked polymer may preferably be used as the material for the polymeric ion-conductive polymer.

Examples of a crosslinking agent for such a crosslinked polymer may include:

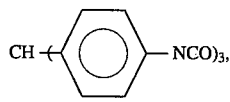

-continued

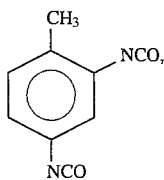

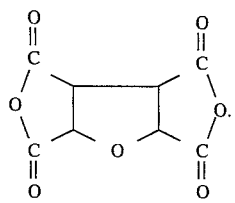

The ion-conductivity of the polymeric ion-conductive film can be imparted by adding a salt such as $LiClO_4$ thereto. Such a salt may preferably be mixed in a monomer unit for a material constituting the polymeric ion-conductive film in a molar ratio of at most 1:10, more preferably at most 1:100. Such a salt can be selected from the above-mentioned examples of the dopant for the alignment film and may generally be a salt of alkaline metal and an anion such as $Cl^-$, $ClO_4^-$ or $SO_3^{2-}$.

In order to effectively apply a voltage to a ferroelectric liquid crystal layer at the time of switching pulse application, the liquid crystal device according to the present invention as shown in FIG. 1 may preferably have the polymeric ion-conductive film having the smallest possible thickness, generally a thickness of at most 100 nm, more preferably at most 50 nm. Further, in order to realize an electrical equilibrium state, the polymeric ion-conductive film of the liquid crystal device may preferably have a smaller thickness in view of a small ion mobility. However, as a thickness of the polymeric ion-conductive film becomes smaller, a relaxation time for self discharge becomes shorter. Accordingly, a suitable thickness of the polymeric ion-conductive film may preferably be determined in view of a balance of the ion mobility and the relaxation time for self discharge.

In the liquid crystal device according to the present invention as shown in FIG. 2, the surface of the polymeric ion-conductive film may preferably be subjected to rubbing. At this time, the ion-conductive film may preferably be rubbed in a direction substantially parallel to the above-mentioned rubbing direction of the organic electroconductive alignment film. Generally, a material for the polymeric ion-conductive film has a glass transition temperature lower than a phase transition temperature to cholesteric phase of an ordinary ferroelectric liquid crystal, so that the polymeric ion-conductive film is realigned along with the alignment axis of the organic electroconductive alignment film as a lower layer during an injection step of the ferroelectric liquid crystal, thus having a property of aligning the ferroelectric liquid crystal. In the liquid crystal device according to the present invention as shown in FIG. 2, the polymeric ion-conductive film may preferably be formed as thin as possible in order to effectively apply a voltage to the ferroelectric liquid crystal layer at the time of switching pulse application and to realize an electrical equilibrium state. The polymeric ion-conductive film may preferably have a thickness of at most 20 nm, more preferably at most 10 nm. Particularly, in order to surely reproduce the alignment axis of the lower organic electroconductive alignment film, the polymeric ion-conductive film may suitably have a thickness of at most 5 nm. In this instance, the polymeric ion-conductive film functions as an alignment film (or alignment control film).

Accordingly, the liquid crystal device of the present invention may include an alignment film comprising an ion-conductive polymer, which is selected from the materials for the polymeric ion-conductive film described above, instead of the organic electroconductive alignment film and the polymeric ion-conductive film.

In this instance, the alignment film may preferably have a thickness of at most 5 nm.

In the present invention, a liquid crystal to be used may preferably be supplied with an AC electric field for an improved initial alignment state.

The above-mentioned polymeric materials for the ion-conductive film and alignment film used in the present invention are not particularly limited as far as such material can provide a film strength applicable to the present invention.

The liquid crystal material 15 used in the present invention as shown in FIG. 1 or 2 is not particularly limited but may preferably be one showing a phase transition from isotropic phase through cholesteric phase and smectic A phase into chiral smectic C phase in the course of temperature decrease in view of easiness in initial homogeneous alignment after liquid crystal injection. Particularly, a chiral smectic liquid crystal showing a helical pitch of 0.8 micron or longer in cholesteric phase (measured at a mid temperature in the cholesteric range) is preferred.

In addition to the above, it is also preferred to use a ferroelectric liquid crystal having a sufficiently large spontaneous polarization of, e.g., at least 10 $nC/cm^2$, so that a spatial dispersion of the spontaneous polarization of a ferroelectric liquid crystal molecule, i.e., a polarization field created by the spatial charge, can affect the molecular orientation of the ferroelectric liquid crystal, particularly in view of stability and reproducibility in the switching process, in combination with the organic electroconductive alignment film and the polymeric ion-conductive film each having the above-mentioned characteristics. Further, it is sufficiently possible to use a ferroelectric liquid crystal not having a cholesteric phase in the course of temperature decrease or having a helical pitch of below 0.5 μm in SmC* phase while accomplishment of initial homogeneous alignment after the liquid crystal injection becomes somewhat difficult.

Figure 3:
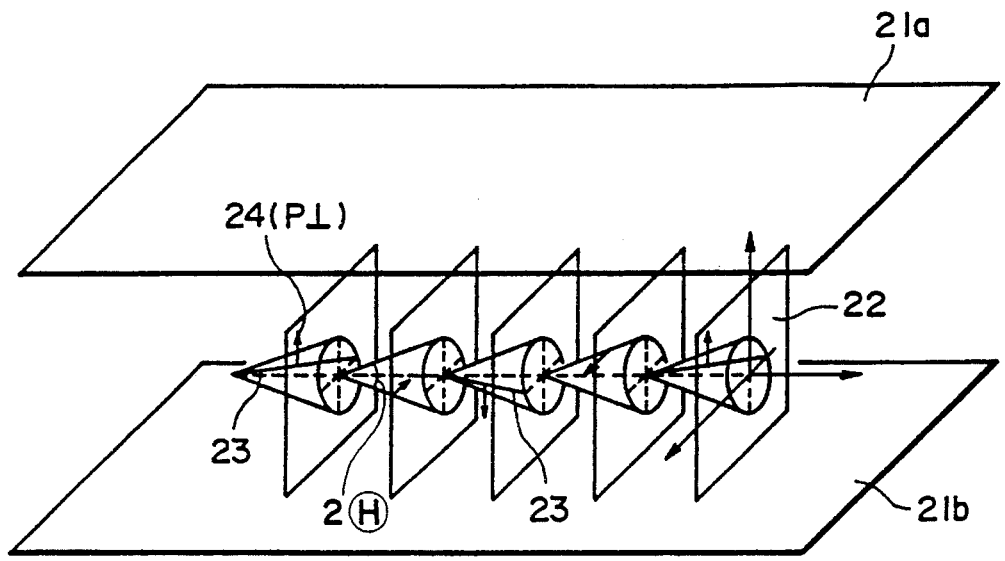
FIG. 3 is a perspective view showing schematically an alignment state of a chiral smectic liquid crystal having a helical structure.

FIG. 3 is a schematic illustration of a ferroelectric liquid crystal cell (device) for explaining operation thereof. Reference numerals 21a and 21b denote substrates (glass plates) on which a transparent electrode of, e.g., $In_2O_3$, $SnO_2$, ITO (indium-tin-oxide), etc., is disposed, respectively. A liquid crystal of an SmC*-phase (chiral smectic C phase) or SmH*-phase (chiral smectic H phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. A half of the apex angle of a helical cone in this state is a tilt angle (H) in chiral smectic phase of such a helical structure.

When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moment (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 4:
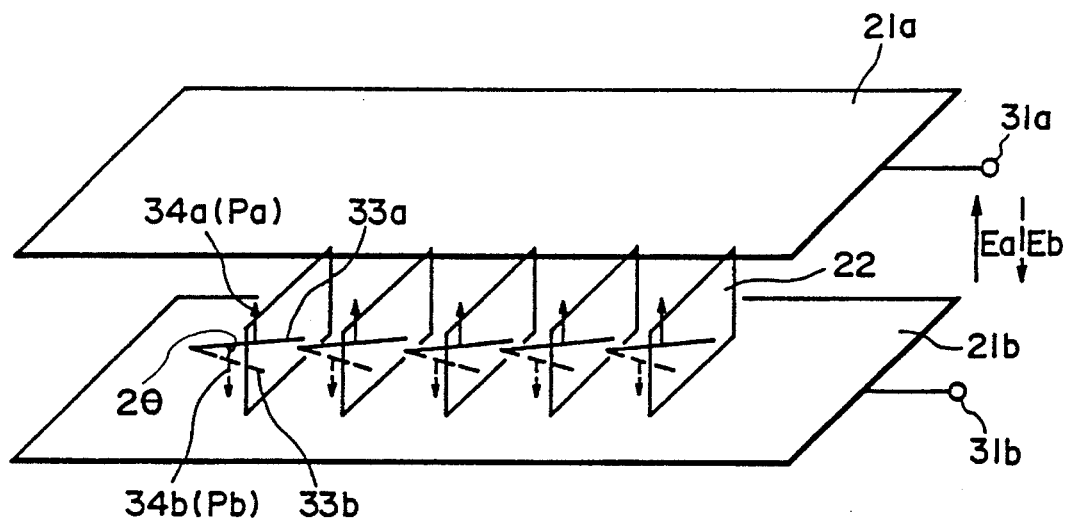
FIG. 4 is a perspective view showing schematically an alignment state of a chiral smectic liquid crystal having a non-helical structure.
Figure 5:
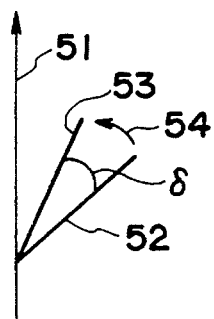
FIG. 5 illustrates a relationship between a uniaxial alignment axis provided to the substrates and liquid crystal molecular axes adjacent to the substrates of a ferroelectric liquid crystal having a non-helical structure.

Further, when the liquid crystal cell is made sufficiently thin (e.g., 0.1–3 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 4, thus providing a bistable condition. When an electric field Ea or Eb higher than a certain threshold level and different from each other in polarity as shown in FIG. 4 is applied to a cell having the above-mentioned characteristics by voltage application means 31a and 31b, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b. A half an angle formed by the first and second stable states corresponds to a tilt angle θ in such a non-helical structure.

A first advantage attained by using such a ferroelectric liquid crystal cell is that the response speed is quite fast, and a second advantage is that the orientation of the liquid crystal shows bistability. The second advantage will be further explained, e.g., with reference to FIG. 4. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

FIG. 6(a) is a schematic sectional view showing an alignment state of liquid crystal molecules attained by the present invention, and FIG. 6(b) is a view showing alignment of corresponding C-directors. Reference numerals 61a and 61b in FIG. 6(a) denote upper and lower substrates, respectively. Numeral 60 denotes a molecular layer composed of liquid crystal molecules 62, and liquid crystal molecules 62 are aligned so as to change their positions along the bottom face 64 (circular) of a cone 63. FIG. 6(b) more specifically shows a change in C-directors. Referring to FIG. 6(b), at $U_1$ are shown C-directors 65 (each being a projection of a molecular long axis onto an imaginary plane perpendicular to the normal to a molecular layer 60) in one stable orientation state, and at $U_2$ are shown C-directors 65 in the other stable orientation state.

On the other hand, an alignment state attained by a conventional rubbing-treated polyimide film may be represented by a C-director diagram of FIG. 6(c), which shows an alignment state wherein molecular axes are twisted in a large degree from the upper substrate 61a to the lower substrate 61b to provide a smaller tilt angle θ.

FIG. 7A is a schematic plan view illustrating a tilt angle θ in an alignment state where C-directors 65 assume a state shown in FIG. 6(b) (referred to as "uniform alignment state"), and FIG. 7B is a schematic plan view illustrating a tilt angle θ in an alignment state where C-directors 65 assume a state shown in FIG. 6(c) (referred to as "splay alignment state"). In these figures, reference numeral 70 denotes a direction of withdrawing a substrate for forming an alignment film on the substrate by the LB (Langmuir-Blodget) technique or a uniaxial alignment axis provided by rubbing onto an alignment film formed by coating or vapor deposition, numeral 71a denotes an average molecular axis in the orientation state $U_1$, numeral 71b denotes an average molecular axis in the orientation state $U_2$, numeral 72a denotes an average molecular axis in the orientation state $S_1$, and numeral 72b denotes an average molecular axis in the orientation state $S_2$. The average molecular axes 71a and 71b can be switched to each other by applying voltages of mutually opposite polarities. Similar switching is caused between the average molecular axes 72a and 72b.

Next, the effectiveness of the uniform alignment state with respect to a delay in optical response (after-image) due to a reverse electric field Vrev is explained. If the capacitance of an insulating layer constituting a liquid crystal cell is denoted by Ci, the capacitance of a liquid crystal layer is denoted by $C_{LC}$ and the spontaneous polarization of the liquid crystal is denoted by $P_S$, Vrev causing after-image is expressed by the following equation.

$$Vrev=2P_S/(Ci+C_{LC})$$

FIG. 8 is a schematic sectional view illustrating changes in charge distribution, direction of $P_S$ and direction of the reverse electric field in a liquid crystal cell. At FIG. 8(a), there is shown a distribution of ⊕ and ⊖ charges in a memory state before application of a pulse electric field, where the spontaneous polarization is directed from ⊕ charges to ⊖ charges. At FIG. 8(b) is shown a state immediately after removal of a pulse electric field, when the direction of the spontaneous polarization $P_S$ is opposite to that shown at FIG. 8(a) (thus, the liquid crystal molecules are inverted from one stable orientation state to the other orientation state) but the distribution of the ⊕ and ⊖ charges is similar to that shown at FIG. 8(a), so that a reverse electric field Vrev is generated as indicated by an arrow shown at FIG. 8(b). The reverse electric field Vrev disappears in a short time to provide a distribution of ⊕ and ⊖ charges as shown at FIG. 8(c).

Figure 10:
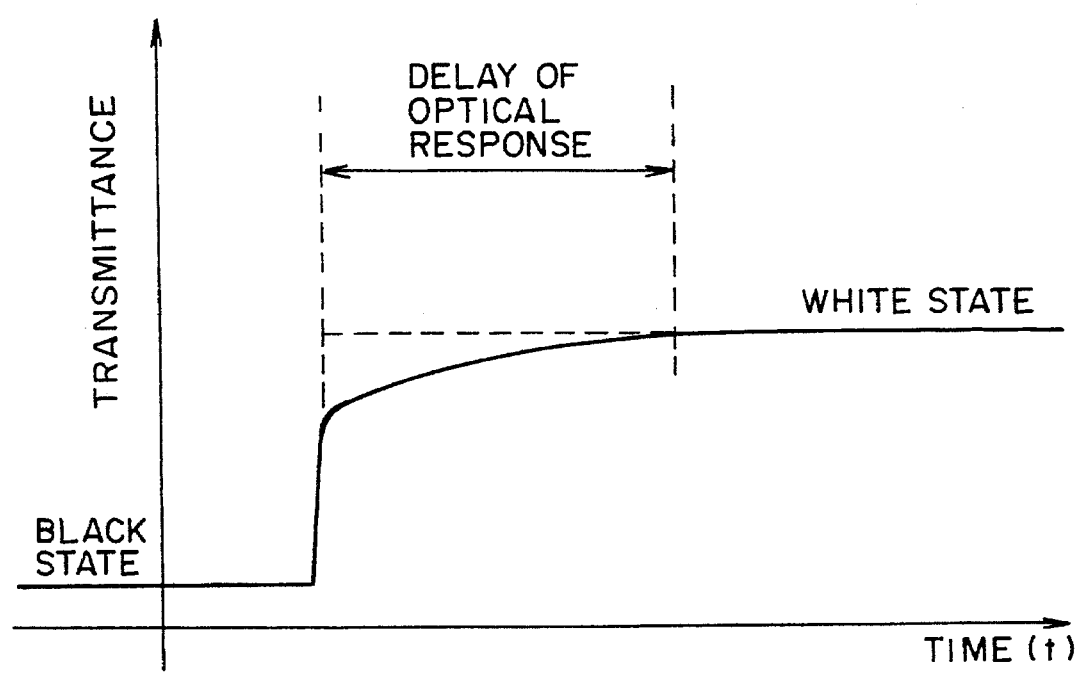
FIGS. 10 and 11 are graphs showing optical response characteristics according to a conventional device and the present invention, respectively.

FIG. 9 is a plan view showing a change in optical response in a splay alignment state given by a conventional polyimide alignment film in terms of a change in tilt angle 8. Referring to FIG. 9, at the time of application of a pulse electric field, the orientation of liquid crystal-molecules is changed from an average molecular axis S(A) in a splay alignment state to be overshot to an average molecular axis $U_2$ in a uniform alignment state close to that providing a maximum tilt angle Ⓗ along a path denoted by an arrow $X_1$, and immediately after the removal of the pulse electric field, the orientation is changed along a path denoted by an arrow $X_2$ to an average molecular axis S(B) in a splay alignment state providing a decreased tilt angle θ due to the action of the reverse electric field Vrev shown at FIG. 8(b). Then, as the reverse electric field Vrev attenuates as shown at FIG. 8(c), the orientation is changed along a path denoted by an arrow $X_3$ to an average molecular axis S(C) in a splay alignment state providing a stable orientation state having a somewhat increased tilt angle θ. The resultant optical response in this case is shown in FIG. 10.

Figure 11:
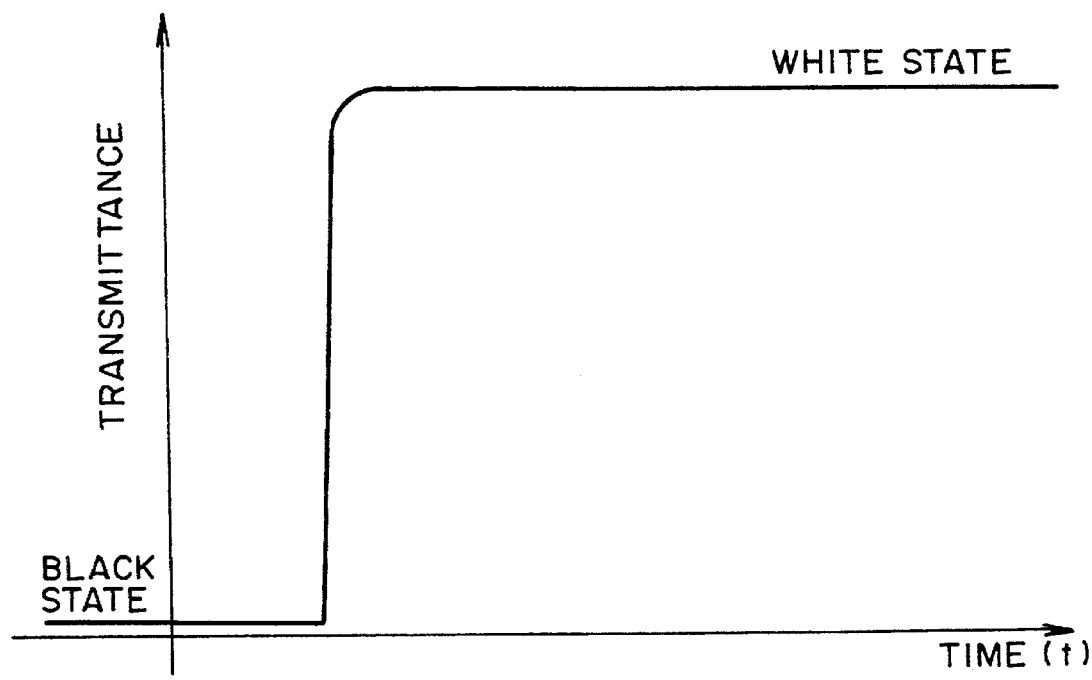

In the alignment state given by using the above-mentioned (organic electroconductive) alignment film and polymeric ion-conductive film constituting the liquid crystal device of the present invention, the average molecular axes S(A), S(B) and S(C) in the splay alignment state shown in FIG. 9 are not caused but it is possible to form an alignment state with an average molecular axis giving a tilt angle θ which is close to a maximum tilt angle (H). An optical response at this time according to the present invention is shown in FIG. 11. FIG. 11 shows that a delay in optical response causing after-image as observed in a conventional liquid crystal device as shown in FIG. 10 is obviated and a high contrast in memory states is caused.

Figure 13:
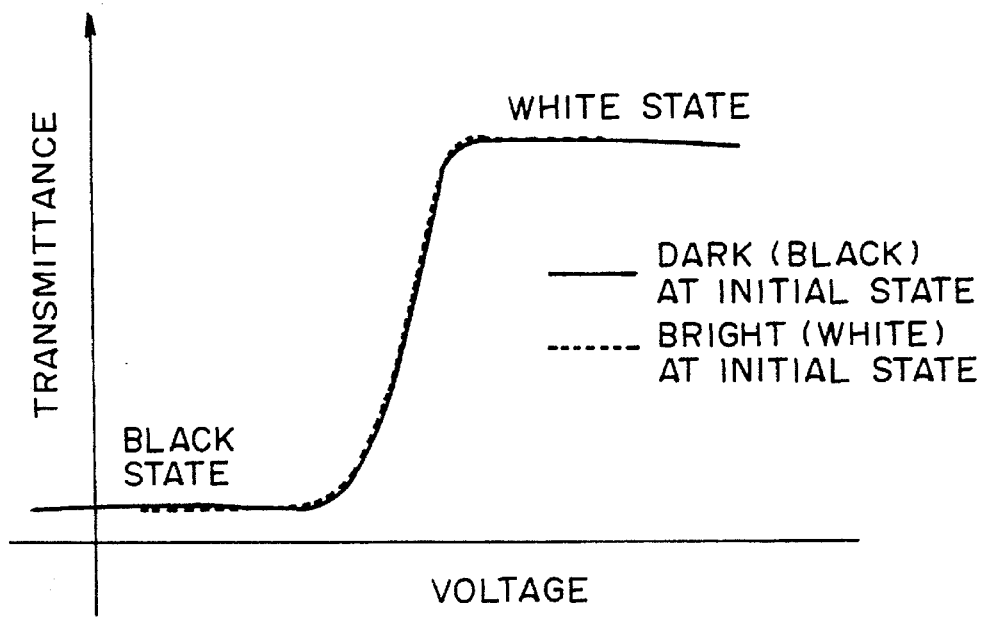
FIG. 13 is a graph showing transmittance-voltage characteristics according to the liquid crystal device of the present invention.

FIG. 13 is a graph showing voltage-transmittance characteristics (V-T characteristics) when a liquid crystal device according to the present invention is supplied with rectangular pulses with a pulse width of 50 μsec and varying amplitudes (or pulse heights). As represented by a solid line (i.e., dark at an initial state) and a dot line (i.e., bright at an initial state) in FIG. 13, it was confirmed that the liquid crystal device of the present invention provided a good alignment state free from a difference in the V-T characteristics irrespective of the initial states (dark state and bright state).

As is more specifically described with reference to Examples shown below, the liquid crystal device of the present invention as shown in FIG. 1 has solved the problems, particularly such as, occurrence of a reverse electric field Vrev caused by the presence of spontaneous polarization of a ferroelectric, an after-image phenomenon during display caused by the Vrev, or a hysteresis phenomenon during switching, by disposing a polymeric ion-conductive film between an (organic electroconductive) alignment film and an electrode. On the other hand, the liquid crystal device of the present invention as shown in FIG. 2 has particularly solved the problem of hysteresis in switching due to charge accumulation with ion species by disposing a polymeric ion-conductive film on the surface of an (organic electroconductive) alignment film. Further, the liquid crystal devices described above according to the present invention has accomplished a good alignment state capable of providing sufficient stability and controllability of minute domains generated in each pixel in order to achieve the principal object of the present invention, i.e., an improvement in a contrast ratio between stable two states showing bistability, suppression of after-image during switching, and realization of a practicable gradation characteristic. The liquid crystal devices have also provided an excellent alignment state which provides a large contrast for pixels in the nonselection state during a multiplexing drive as disclosed in U.S. Pat. No. 4,655,561, and obviates a delay in optical response at the time of switching (multiplexing drive) leading to after-image in display.

EXAMPLE 1

In this example, a liquid crystal device as shown in FIG. 1 was prepared and was subjected to evaluation of display characteristics and driving characteristics in the following manner.

Two 1.1 mm-thick glass plates (substrates) each provided with 1500 Å-thick ITO stripe electrodes were respectively coated with a 0.5% (by weight)-solution of $LiClO_4$ and a network polymer comprising a crosslinked PEO (polyethylene oxide) represented by the above-mentioned formula (1) by using a crosslinking agent having the following structural formula:

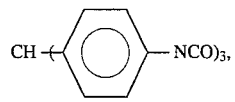

(weight ratio of $LiClO_4$: network polymer=1:8) in acetonitrile by spin coating at a rotation speed of 1000 rpm to form a 30 nm-thick polymeric ion-conductive film.

The thus formed polymeric ion-conductive film on the substrate was coated with a 1% (by weight)-solution of polyaniline in NMP (N-methylpyrrolidone) by spin coating at a rotation speed of 2000 rpm to form a coating for an alignment film, followed by quick drying and coating with 1N-aqueous solution of perchloric acid to effect doping. The resultant substrate was washed with pure water and sufficiently dried to form an about 15 nm-thick alignment film on the substrate.

The thus formed alignment film on the substrate was then subjected to a rubbing treatment under the conditions of a rubbing roller pile yarn pressing depth of 0.4 mm, a rubbing roller rotation speed of 1000 rpm and a substrate feed rate of 12 mm/sec.

On one of the two Glass plates thus treated, 1.5 μm-dia. alumina beads were dispersed, and the other glass plate was superposed thereon so that their rubbing axes were parallel to each other and disposed in the same direction to form a blank cell (panel).

The blank cell was filled with a biphenyl ester-based ferroelectric liquid crystal ("CS-1014" (trade name), available from Chisso K. K.) under vacuum and, after sealing, was gradually cooled from isotropic phase at a rate of 0.5° C./min. to 30° C., whereby an alignment was effected. The "CS-1014" liquid crystal in the cell showed the following phase transition series.

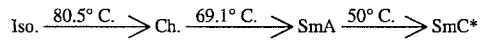

Iso.: isotropic phase,
Ch.: cholesteric phase,
SmA: smectic A phase,
SmC*: chiral smectic C phase.

Figure 14:
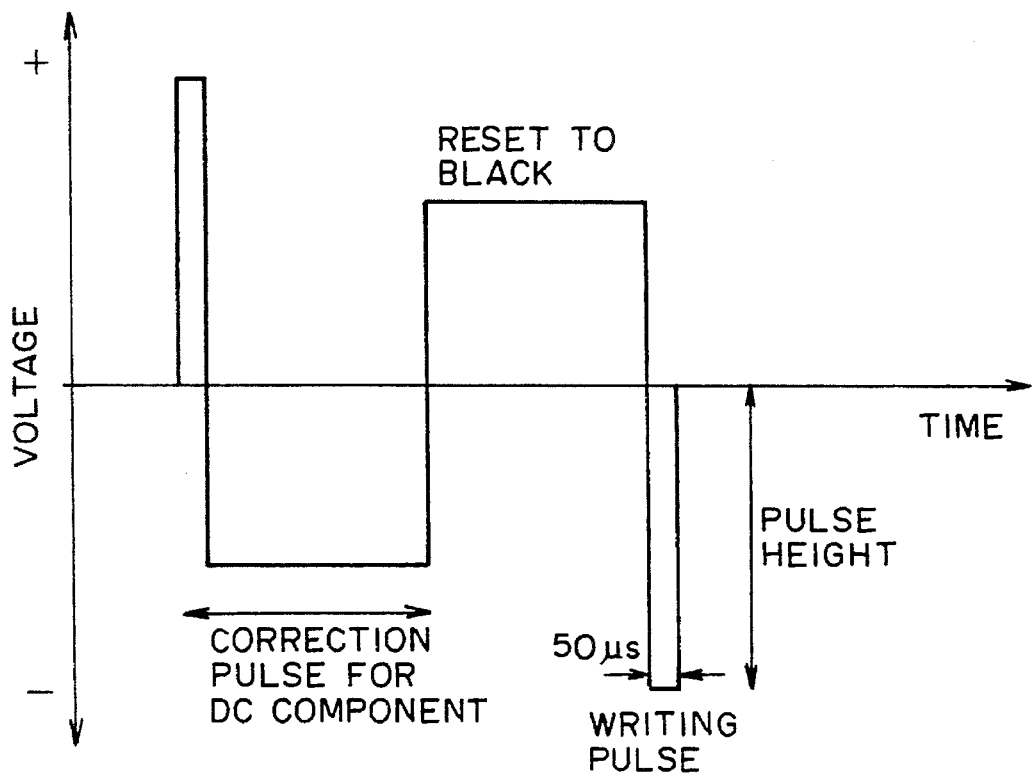
FIG. 14 is a waveform diagram illustrating an applied waveform used in measurement of a transmittance-voltage characteristic.

The above-prepared liquid crystal cell was sandwiched between a pair of 90 degrees-cross nicol polarizers to provide a liquid crystal device. The liquid crystal device was supplied with rectangular pulses with a pulse width of 50 μsec and varying amplitude (pulse heights) to measure V-T (voltage-transmittance) characteristics. The results are show in FIG. 13. Further, FIG. 14 is a waveform diagram showing an applied waveform for the above measurement.

As apparent from the results shown in FIG. 13, the liquid crystal device according to the present invention showed substantially same V-T characteristics as represented by a solid line (dark at initial state) and a dot line (bright at initial state), irrespective of such initial states and also showed no hysteresis phenomenon. The moderate V-T characteristics (causing a gradual change in transmittance in response to a voltage change) may be attributable to the distribution of minute regions having different threshold voltages over a pixel. Such moderate V-T characteristics were found to provide a halftone display characteristic.

The liquid crystal device was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby a tilt angle θ, a contrast (i.e., a ratio of transmittances between the brightest state and the darkest state), and a delay time in optical response leading to after-image were measured.

The liquid crystal device showed a transmittance in the darkest state of 0.8% and a transmittance in the bright state of 43%, thus providing a contrast of 53:1. A delay in optical response causing after-image was at most 0.1 sec and was thus satisfactory.

Figure 12:
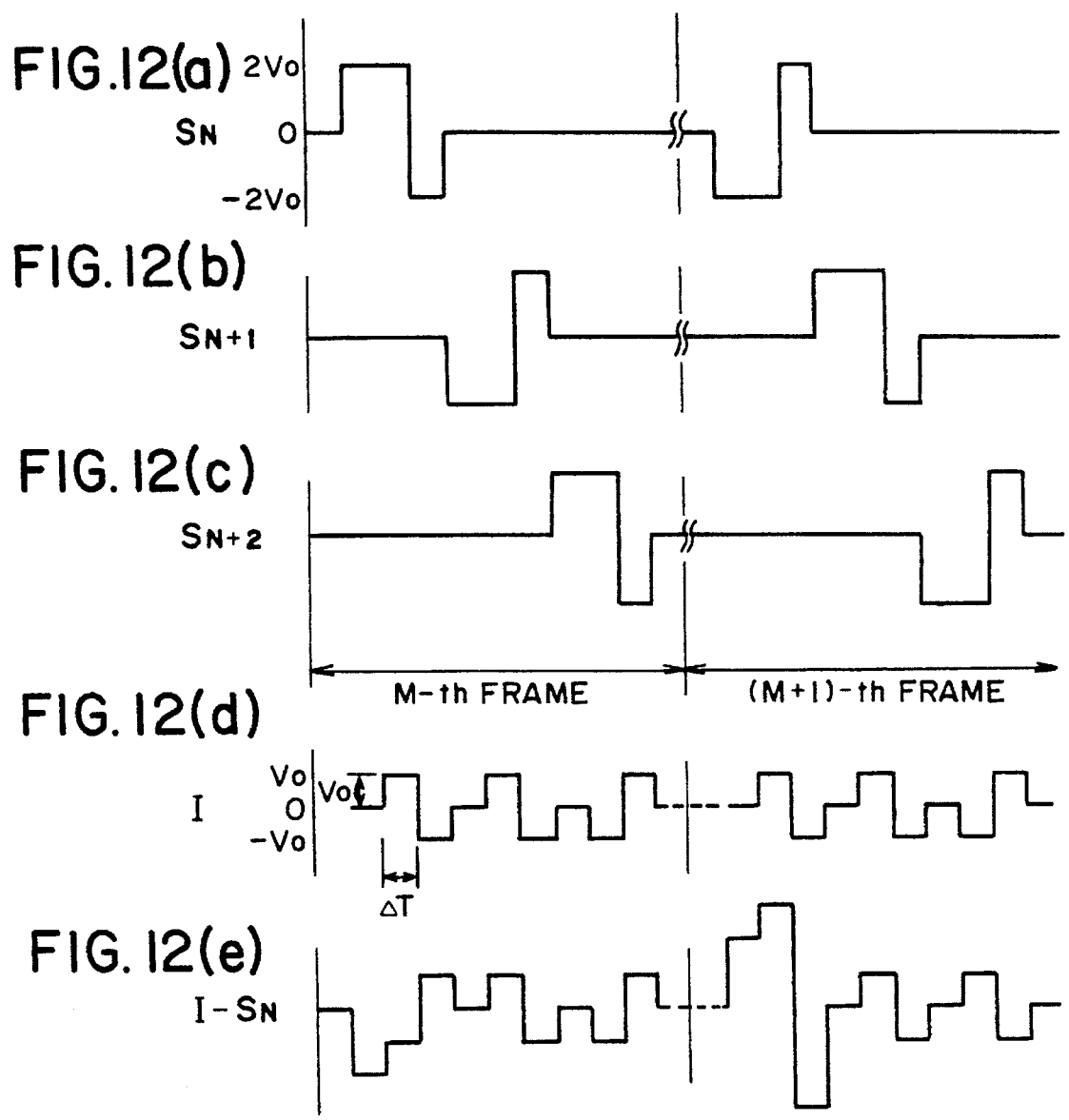
FIGS. 12a–e are a waveform diagram illustrating driving waveforms used in an embodiment of the present invention.

The liquid crystal device was subjected to multiplexing drive for display using driving waveforms shown in FIG. 12, whereby a high-quality display with a high contrast was attained. Further, after an image display of a prescribed character image, the whole picture area was erased into "white", whereby no after-image was recognized. Referring to FIG. 12, at $S_N$, $S_{N+1}$ and $S_{N+2}$ are shown voltage waveforms applied to scanning lines, at I is shown a voltage waveform applied to a representative date line, and at (I-$S_N$) is shown a combined voltage waveform applied to the data line I and the scanning line $S_N$. In the above embodiment, the drive was performed under the conditions of $V_0$=5–8 volts and ΔT=20–70 μsec.

EXAMPLE 2

Five liquid crystal devices were prepared in the same manner as in Example 1 except that: the PEO of the formula (1) for the polymeric ion-conductive film is changed to polymers of the formulae (2) to (6), respectively; the 1% (by weight)-solution of polyaniline in NMP for the alignment film is changed to 0.5% (by weight)-solution of polypyrrole in NMP; a thickness of the alignment film is changed from about 15 nm to 20 nm; and the doping treatment is changed to an electroconductive treatment wherein a current of 0.1 mA is applied for several hours to the alignment film in a 20–30 wt. %-LiClO$_4$ in acetonitrile.

Each of the thus prepared liquid crystal devices was evaluated in the same manner as in Example 1. The results are shown in Table 1 below. Further, the liquid crystal device showed no difference in V-T characteristic irrespective of the initial states (i.e., dark state and bright state), thus causing no hysteresis.

TABLE 1

| Material | Tilt angle (deg.) | Contrast | Hysteresis | Delay time |
|---|---|---|---|---|
| Formula (2) | 15 | 53:1 | Not observed | ≧0.1 sec |
| Formula (3) | 15 | 53:1 | Not observed | " |
| Formula (4) | 15 | 55:1 | Not observed | " |
| Formula (5) | 15 | 55:1 | Not observed | " |
| Formula (6) | 15 | 55:1 | Not observed | " |

The liquid crystal device showed a transmittance in the darkest state of 0.8% and a transmittance in the bright state of 42% in any case. The delay in optical response causing after-image was at most 0.1 sec in any case and was thus satisfactory.

Further, as a result of multiplexing drive in the same manner as in Example 1, similarly good results as in Example 1 were obtained with respect to contrast and after-image.

EXAMPLE 3

A biphenyl ester-based ferroelectric liquid crystal showing the following transition was used instead of the ferroelectric liquid crystal ("CS1014") used in Example 1.

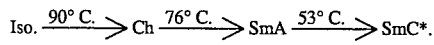

The liquid crystal showed a helical structure with a helical pitch of about 4 μm when formed in a large layer thickness (around 100 μm). The liquid crystal showed a spontaneous polarization of about 10 nC/cm$^2$ as measured by the triangular wave method and a tilt angle θ of 23.5 degrees (at a cell thickness of 1.5 μm) which is close to the optimum value.

The liquid crystal was injected into a blank cell identical to the one prepared by using an alignment film comprising polyaniline to form a liquid crystal cell. The liquid crystal cell showed an apparent tilt angle θ of 16 degrees which was smaller than the optimum value.

Then, the liquid crystal cell was supplied with an AC voltage of ±45–55 volts and a frequency of 40 Hz for 15 min., when a domain providing a tilt angle θ of 20.2 degrees began to appear. When the AC voltage was increased to the range of 55–70 volts, the domain of the increased tilt angle was enlarged to the entire cell, thus providing a very good contrast. On the contrary, at an AC voltage in excess of 70 volts, numerous defects occurred to collapse the monodomain structure. Switching between bistable states after appearance of the stable monodomain was effected according to the following voltage-pulse width characteristic.

TABLE 2

| Pulse width (msec) | 1.5 | 1.0 | 0.5 |
|---|---|---|---|
| Voltage (V) | 16.2 | 17.0 | 21.0 |

The change in alignment state after the AC voltage application was considered to be caused by the release of a twist of a liquid crystal molecular layer as shown in FIG. 6(a). Further, the inversion voltage was increased from that before the AC voltage application. The reason for this has not been clarified as yet but it might be considered that a higher inversion voltage is required in order to invert liquid crystal molecules inclusive of those in the vicinity of the alignment films. The quantity of transmitted light in the bright state was remarkably increased, thus providing a remarkably increased contrast ratio, due to the increase in tilt angle θ after the AC voltage application. Further, the delay in optical response to an inversion electric field was at most 0.1 sec, and stable switching was possible.

A ferroelectric liquid crystal phase showing bistability is generally developed by cooling from a higher temperature. In this embodiment, when the cooling was effected under application of an AC electric field of 50 Hz and 65 volts, a homogeneous monodomain alignment state was realized over a wide range.

EXAMPLE 4

A blank cell was prepared by using a pair of electrode plates each having a polymeric ion-conductive film of a crosslinked PEO/LiClO$_4$ and an alignment film of polyaniline prepared in the same manner as in Example 1 and by affixing the electrode plates so that their rubbing directions were antiparallel to each other. A liquid crystal cell was prepared by filling the blank cell with the same ferroelectric liquid crystal as in Example 3 and supplied with an AC voltage of 40 Hz and 60 V for 15 min., whereby a homogenous monodomain alignment state providing a tilt angle θ of 22.0 degrees was developed. The liquid crystal cell was evaluated in the same manner as in Example 1 and found to provide a contrast ratio which was remarkably improved compared with that in Example 1.

Further, as a result of multiplexing drive in the same manner as in Example 1, similarly good results as in Example 1 were obtained with respect to contrast and after-image.

Figure 15:
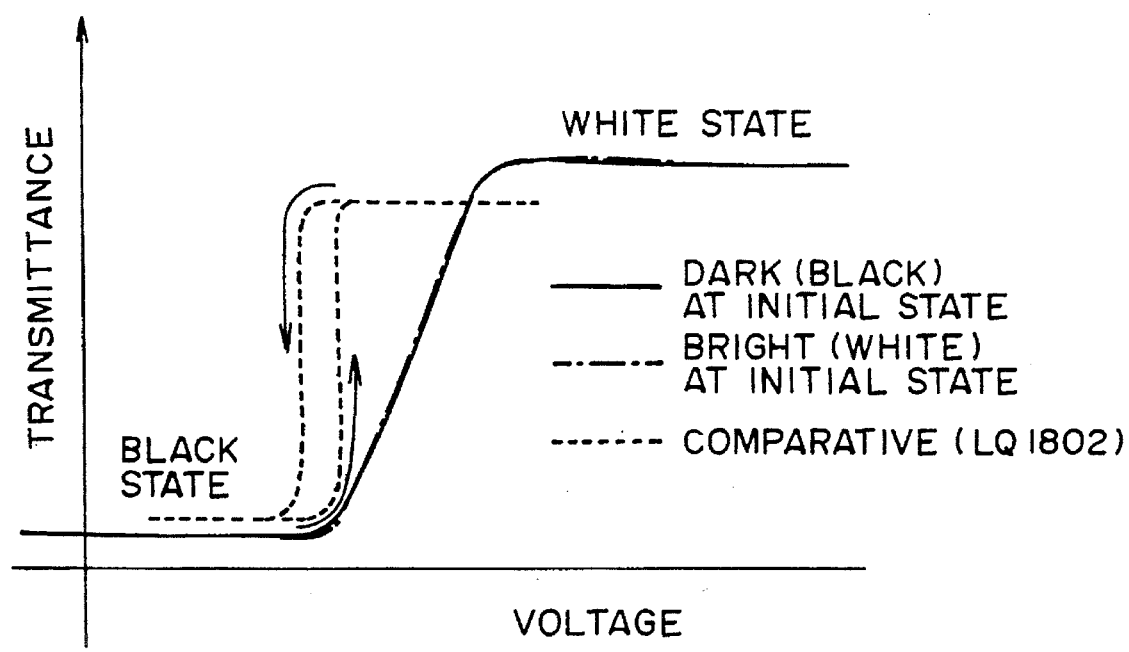
FIG. 15 is a graph showing transmittance-voltage characteristics of liquid crystal devices according to the invention and a comparative device.

Then, the liquid crystal cell was supplied with rectangular pulses with a pulse width of 50 μsec and varying amplitudes whereby voltage (V)-transmittance (T) characteristics as represented by a solid line and a dot-and-dash line in FIG. 15 were obtained. The V-T characteristics were more moderate than the V-T characteristic of a comparative liquid crystal cell with 8-layer LB films of LQ 1802 polyimide alone represented by a dot line in FIG. 15. The liquid crystal cell of this example was found to provide a larger contrast and no hysteresis with respect to V-T characteristic resulting from the difference in initial state compared with the comparative liquid crystal cell as shown in FIG. 15. The moderate V-T characteristics (causing a gradual change in transmittance in response to a voltage change) may be attributable to the distribution of minute regions having different threshold voltages over a pixel. Such moderate V-T characteristics attained by forming an organic electroconductive alignment film on a polymeric ion-conductive film were found to improve a halftone display characteristic.

EXAMPLE 5

Five blank cells were prepared in the same manner as in Example 2 except that each pair of electrode plates were disposed so that their rubbing directions were anti-parallel to each other. Five liquid crystal cells were prepared by filling the blank cells with the same ferroelectric liquid crystal as in Example 3 and supplied with an AC voltage of 40 Hz and 60 V for 15 min., whereby a homogenous monodomain alignment state providing a tilt angle θ of 21.5 degrees was developed. The liquid crystal cells were evaluated in the same manner as in Example 4 and found to provide a contrast ratio which was remarkably improved compared with those in Example 2.

Further, as a result of multiplexing drive in the same manner as in Example 4, similarly good results as in Example 4 were obtained with respect to contrast and after-image.

Then, the liquid crystal cells were supplied with rectangular pulses with a pulse width of 50 μsec and varying amplitudes whereby moderate V-T characteristics (causing a gradual change in transmittance in response to a voltage change) resulting from the distribution of minute regions having different threshold voltages over a pixel were obtained. Such moderate V-T characteristics were found to be suitable for halftone display.

EXAMPLE 6

In this example, a liquid crystal device as shown in FIG. 2 was prepared and was subjected evaluation of display characteristics and driving characteristics in the following manner.

Two 1.1 mm-thick glass plates each provided with 1500 Å-thick ITO electrodes were respectively coated with a 1% (by weight)-solution of polyaniline in NMP by spin coating at a rotation speed of 2000 rpm to form an about 15 nm-thick alignment film. Then, each substrate provided with an alignment film was subjected to electrolytic oxidation of the alignment film within a solution of $LiClO_4$ at 0.5M in acetonitrile while applying a voltage of 0.5 volt to the substrate. The electrolytic oxidation was stopped when the oxidation current started to be decreased. As a result of measurement of electroconductivity, the alignment film showed a conductivity on the order of $10^{-1}$ S/cm at the parts above the electrodes and a conductivity on the order of $10^{-7}$ S/cm at the parts other than electrodes.

The thus formed polyimide film on the substrate was then subjected to a rubbing treatment under the conditions of a rubbing roller pile yarn pressing depth of 0.4 mm, a rubbing roller rotation speed of 1000 rpm and a substrate feed rate of 12 mm/sec.

Then, the above rubbing-treated alignment film on the substrate was further coated with a 0.5% (by weight)-solution of a mixture of $LiClO_4$ and PEO (polyethylene oxide) represented by the above-mentioned formula (1) (weight ratio of $LiClO_4$: PEO=1:8) in acetonitrile by spin coating to form a 4 nm-thick polymeric ion-conductive film.

The thus formed polymeric ion-conductive film was subjected to a rubbing treatment so as to provide a rubbing axis parallel to the rubbing axis of the lower alignment film under the conditions of a rubbing roller pile yarn pressing depth of 0.1 mm, a rubbing roller rotation speed of 1000 rpm and a substrate feed rate of 12 mm/sec.

On one of the two glass plates thus treated, 1.5 μm-dia. alumina beads were dispersed, and the other glass plate was superposed thereon so that their rubbing axes were parallel to each other and disposed in the same direction to form a blank cell (panel).

The blank cell was filled with the ferroelectric liquid crystal as in Example 1 and then was subjected to evaluation in the same manner as in Example 1. Similarly as in Example 1, a difference in V-T characteristic was not observed, irrespective of the initial states (i.e., dark state and bright state), thus showing no hysteresis during the driving. Good results similarly as in Example 1 were also obtained with respect to contrast and after-image.

EXAMPLE 7

A liquid crystal cell was prepared and evaluated in the same manner as in Example 6 except that an polymeric ion-conductive film was formed by extension with a 1N-$LiClO_4$ aqueous solution instead of spin coating. As a result of the evaluation, similarly good results as in Example 6 were obtained. More specifically, a difference in V-T characteristic was not observed irrespective of the initial states. (i.e., dark state and bright state), thus showing no hysteresis during the driving.

Further, moderate V-T characteristics (causing a gradual change in transmittance in response to a voltage change) resulting from the distribution of minute regions having different threshold voltages over a pixel were obtained. Such moderate V-T characteristics were found to be suitable for halftone display.

EXAMPLE 8

A 200 Å-thick polyaniline alignment film was formed by spin coating of a soluble precursor of poly-2,5-thienylene vinylene on electrode plates identical to those used in Example 6 followed by baking under heating. As a result of electrolytic oxidation in the same manner as in Example 6, the alignment film showed a conductivity on the order of $10^0$ S/cm at the parts above the electrode and a conductivity on the order of $10^{-9}$ S/cm at the parts other than electrodes. Substantially, liquid crystal cells were prepared in the same manner as in Example 6 except for using ion-conductive polymers of the formulae (2) to (6), respectively, and changing a thickness of the polymeric ion-conductive to 5 nm, respectively.

The thus formed liquid crystal cells were subjected to evaluation of display characteristics in the same manner as in Example 1. The results are shown in Table 3 below.

Further, similarly as in Example 6, a difference in V-T characteristic was not observed, irrespective of the initial states (i.e., dark state and bright state), thus showing no hysteresis during the driving.

TABLE 3

| Material | Tilt angle (deg.) | Contrast | Hysteresis | Delay time |
|---|---|---|---|---|
| Formula (2) | 15 | 53:1 | Not observed | $\geq 0.1$ sec |
| Formula (3) | 15 | 52:1 | Not observed | " |
| Formula (4) | 15 | 52:1 | Not observed | " |
| Formula (5) | 15 | 52:1 | Not observed | " |
| Formula (6) | 15 | 52:1 | Not observed | " |

The liquid crystal device showed a transmittance in the darkest state of 0.8% and a transmittance in the bright state of 43% in any case. The delay in optical response causing after-image was at most 0.1 sec in any case and was thus satisfactory.

Further, as a result of multiplexing drive in the same manner as in Example 1, similarly good results as in Example 1 were obtained with respect to contrast and after-image.

EXAMPLE 9

A blank cell was prepared in the same manner as in Example 6 and by affixing the electrode plates so that their rubbing directions were anti-parallel to each other. A liquid crystal cell was prepared by filling the blank cell with the same ferroelectric liquid crystal as in Example 3 and supplied with an AC voltage of 40 Hz and 60 V for 15 min., whereby a homogenous monodomain alignment state providing a tilt angle θ of 21.9 degrees was developed. The liquid crystal cell was evaluated in the same manner as in Example 6 and found to provide a contrast ratio which was remarkably improved compared with that in Example 6.

Further, as a result of multiplexing drive in the same manner as in Example 6, similarly good results as in Example 6 were obtained with respect to contrast and after-image.

Then, the liquid crystal cell was supplied with rectangular pulses with a pulse width of 50 μsec and varying amplitudes whereby voltage (V)-transmittance (T) characteristics similar to those in Example 4 as represented by a solid line and a dot-and-dash line in FIG. 15 were obtained. The V-T characteristics were more moderate than the V-T characteristic of a comparative liquid crystal cell with 8-layer LB films of LQ 1802 polyimide alone similar to that in Example 4 represented by a dot line in FIG. 15. The liquid crystal cell of this example was found to provide a larger contrast and no hysteresis with respect to V-T characteristic resulting from the difference in initial state compared with the comparative liquid crystal cell as shown in FIG. 15. The moderate V-T characteristics (causing a gradual change in transmittance in response to a voltage change) resulting from the distribution of minute regions having different threshold voltages over a pixel were obtained. Such moderate V-T characteristics attained by forming a polymeric ion-conductive film on an organic electroconductive alignment film were found to improve a halftone display characteristic.

EXAMPLE 10

Five blank cells were prepared in the same manner as in Example 8, respectively, and by affixing each pair of electrode plates so that their rubbing directions were anti-parallel to each other. Five liquid crystal cells were prepared by filling the blank cells with the same ferroelectric liquid crystal as in Example 9 and supplied with an AC voltage of 40 Hz and 60 V for 15 min., whereby homogenous monodomain alignment states providing a tilt angles θ of 21.9 degrees, 21.5 degrees, 21.5 degrees, 21.6 degrees and 21.6 degrees, respectively, were developed. The liquid crystal cells were evaluated in the same manner as in Example 8 and found to provide contrast ratios which were remarkably improved compared with those in Example 8.

Further, as a result of multiplexing drive in the same manner as in Example 8, similarly good results as in Example 8 were obtained with respect to contrast and after-image.

Then, the liquid crystal cells were supplied with rectangular pulses with a pulse width of 50 μsec and varying amplitudes whereby moderate V-T characteristics (causing a gradual change in transmittance in response to a voltage change) resulting from the distribution of minute regions having different threshold voltages over a pixel were obtained. Such moderate V-T characteristics were found to be suitable for halftone display.

As described hereinabove, according to the present invention, the following advantageous effects can be accomplished.

(1) A good alignment state of a liquid crystal free from a difference in V-T characteristic and hysteresis during driving can be obtained irrespective of initial state (dark or bright).

(2) While a liquid crystal device using a ferroelectric liquid crystal having a large spontaneous polarization has been considered to provide an inferior drive characteristic because of a reverse electric field effect, a liquid crystal device of the present invention provides a good drive characteristic free from the reverse electric field effect even when such a ferroelectric liquid crystal is used.

(3) It is possible to provide a large tilt angle particularly in a non-helical structure of a chiral smectic liquid crystal, thus providing a high contrast between the dark and bright states, particularly a high quality display with a very high display contrast during multiplexing drive without being accompanied with an ugly after-image phenomenon.

(4) It is possible to provide a pixel having a distribution of minute regions showing different threshold voltages,

What is claimed is:

1. A liquid crystal device, comprising: a pair of substrates each having thereon an electrode, a polymeric ion-conductive film and an organic electroconductive alignment film in this order, and a liquid crystal disposed between the substrates; wherein said polymeric ion-conductive film comprises a material selected from the group consisting of polyether, polyester, polyimine and crosslinked polymer thereof represented by the following formulae

  (1)

  (2)

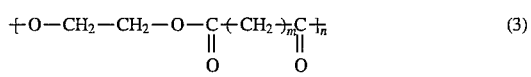  (3)

  (4)

  (5)

  (6)

2. A liquid crystal device, comprising: a pair of substrates each having thereon an electrode, an organic electroconductive alignment film, and a polymeric ion-conductive film in this order, and a liquid crystal disposed between the substrates; wherein said polymeric ion-conductive film comprises a material selected from the group consisting of polyether, polyester, polyimine and crosslinked polymer thereof represented by the following formulae (1) to (6):

  (1)

  (2)

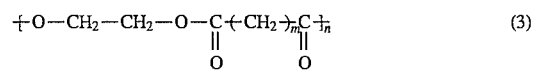  (3)

  (4)

  (5)

  (6)

3. A liquid crystal device according to claim 2, wherein said electrode is locally disposed at a part on the substrate, and said organic electroconductive alignment film having a high conductive part imparted with a conductivity of at least $10^{-4}$ S/cm, said high conductive part being selectively disposed on said electrode.

4. A liquid crystal device according to claim 2, wherein said polymeric ion-conductive film is an alignment control film.

5. A liquid crystal device according to claim 4, wherein said polymeric ion-conductive film has a thickness of at most 5 nm.

6. A liquid crystal device according to any one of claims 1 to 3 and 4, wherein said polymeric ion-conductive film has a thickness of at most 50 nm.

7. A liquid crystal device according to any of claims 1 to 3, wherein said organic electroconductive alignment film comprises a material selected from the group consisting of: polypyrrole, polyaniline and derivatives thereof represented by the following formula (7) and (8):

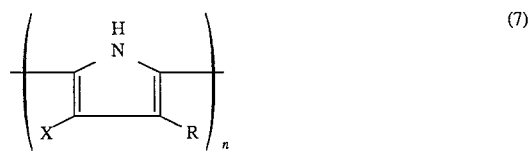  (7)

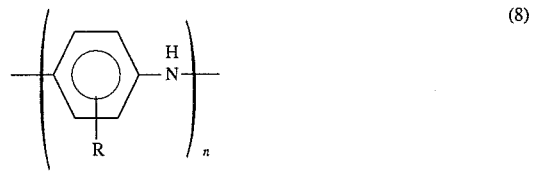  (8)

wherein X=H or —CO—R, R=$C_mH_{2m+1}$, and m is an integer of 0–12; polythiophene, polyarylene-vinylene and derivatives thereof; and poly(pyridine-2,5-diyl), poly(2,2'-bipyridine-5,5'-diyl), poly(pyridine-5,2-diyl-thiophene-2,5-diyl) and derivatives thereof.

8. A liquid crystal device according to any of claims 1 to 3 and 4, wherein said liquid crystal has a spontaneous polarization of at least 10 nC/cm².

9. A liquid crystal device according to any of claims 1 to 3 and 4, wherein said liquid crystal is a ferroelectric liquid crystal showing a helical pitch of at most 0.5 μm in SmC* phase.

10. A liquid crystal device according to any of claims 1 to 3 and 4, wherein said liquid crystal has been supplied with an AC electric field for an improved initial alignment state.

UNITED STATES PATENT AND TRADEMARK OFFICE
CERTIFICATE OF CORRECTION

PATENT NO. : 5,597,626
DATED : January 28, 1997
INVENTOR(S) : KEN EGUCHI

It is certified that error appears in the above-identified patent and that said Letters Patent is hereby corrected as shown below:

COLUMN 1

Line 26, "of" should be deleted.
Line 34, "Crystal" should read --crystal--.
Line 36, "SmH*," should read --SmH*--.

COLUMN 5

Line 8, "FIGS. 8A-8C" should read --FIGS. 8(a)-8(c)--.
Line 16, "FIGS. 12a-e" should read --FIGS. 12(a)-12(e)--.

COLUMN 6

Line 2, "formula (7)" should read --formulae (7)--.
Line 66, "be" should read --should be--.

COLUMN 7

Line 8, "(Langmuir-Blodget)" should read
--(Langmuir-Blodgett)--.

COLUMN 10

Line 47, "operation" should read --the operation--.
Line 67, "moment" should read --moments--.

COLUMN 12

Line 7, "Blodget)" should read --Blodgett)--.
Line 48, "angle 8." should read --angle $\theta$.--.

UNITED STATES PATENT AND TRADEMARK OFFICE
CERTIFICATE OF CORRECTION

PATENT NO. : 5,597,626
DATED : January 28, 1997
INVENTOR(S) : KEN EGUCHI

It is certified that error appears in the above-identified patent and that said Letters Patent is hereby corrected as shown below:

COLUMN 13

Line 29, "an" should be deleted.

COLUMN 14

Line 22, "Glass" should read --glass--.
Line 48, "show" should read --shown--.
Line 53, "same" should read --the same--.

COLUMN 15

Line 7, "bright" should read --brightest--.
Line 49, "$\geq 0.1$ sec" should read --$\leq 0.1$ sec--.

COLUMN 18

Line 49, "an" should read --a--.

COLUMN 19

Line 25, "$\geq 0.1$ sec" should read --$\leq 0.1$ sec--.

COLUMN 20

Line 24, "a" should be deleted.
Line 59, "angle" should read --angle,--.

UNITED STATES PATENT AND TRADEMARK OFFICE
CERTIFICATE OF CORRECTION

PATENT NO.  :  5,597,626
DATED       :  January 28, 1997
INVENTOR(S) :  KEN EGUCHI It is certified that error appears in the above-identified patent and that said Letters Patent is hereby corrected as shown below:

COLUMN 21

Line 11, "formulae" should read --formulae (1) to (6):--.
Col. 22 Line 17, "1 to 3 and 4," should read --1 to 4,--.
Line 23, "formula (7)" should read --formulae (7)--.
Line 43, "3 and 4," should read --4,--.
Line 46, "3 and 4," should read --4,--.
Line 50, "3 and 4," should read --4,--.

Signed and Sealed this

Twenty-ninth Day of July, 1997

Attest:

BRUCE LEHMAN

Attesting Officer

Commissioner of Patents and Trademarks